(No Model.) 4 Sheets—Sheet 1.

J. B. LYON.
MOLD FOR PRESSING ARTICLES OF GLASSWARE.

No. 285,496. Patented Sept. 25, 1883.

Witnesses

J. W. Bakewell
Jno. K. Smith

Inventor

James B. Lyon
by his attorneys
Bakewell & Kerr (No Model.)

4 Sheets—Sheet 2.

J. B. LYON.
MOLD FOR PRESSING ARTICLES OF GLASSWARE.

No. 285,496.    Patented Sept. 25, 1883.

Witnesses:
T. W. Bakewell
Jno. K. Smith

Inventor
James B. Lyon
by his attorneys
Bakewell & Kerr (No Model.) 4 Sheets—Sheet 3.

J. B. LYON.
MOLD FOR PRESSING ARTICLES OF GLASSWARE.

No. 285,496. Patented Sept. 25, 1883.

Witnesses—
T. W. Bakewell
Jno. K. Smith

Inventor—
James B. Lyon
by his attys
Bakewell & Kerr (No Model.) 4 Sheets—Sheet 4.

J. B. LYON.
MOLD FOR PRESSING ARTICLES OF GLASSWARE.

No. 285,496. Patented Sept. 25, 1883.

Witnesses_
T. W. Bakewell
John K Smith

Inventor_
James B. Lyon
by his attorneys
Bakewell & Kerr

UNITED STATES PATENT OFFICE.

JAMES B. LYON, OF PITTSBURG, PENNSYLVANIA.

MOLD FOR PRESSING ARTICLES OF GLASSWARE.

SPECIFICATION forming part of Letters Patent No. 285,436, dated September 25, 1883.

Application filed July 20, 1883. (No model.)

*To all whom it may concern:*

Be it known that I, JAMES B. LYON, of Pittsburg, in the county of Allegheny and State of Pennsylvania, have invented a new and useful Improvement in Molds for Pressing Articles of Glassware; and I do hereby declare the following to be a full, clear, and exact description thereof, reference being had to the accompanying drawings, forming part of this specification, in which—

Figure 1:
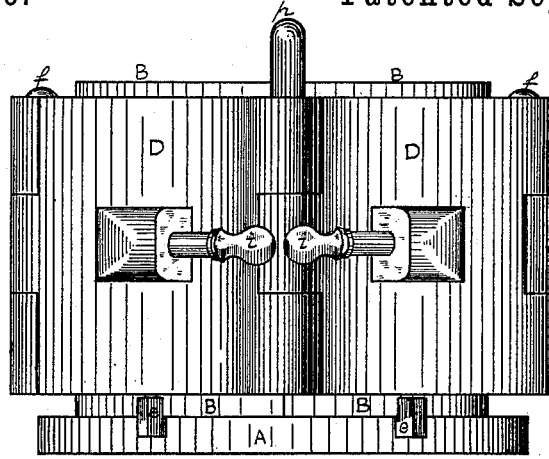
Figure 2:
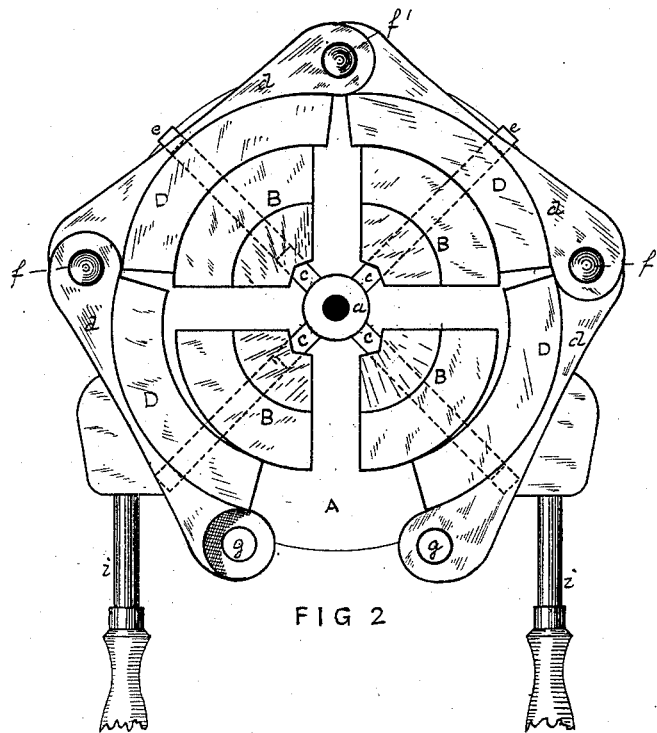
Figure 3:
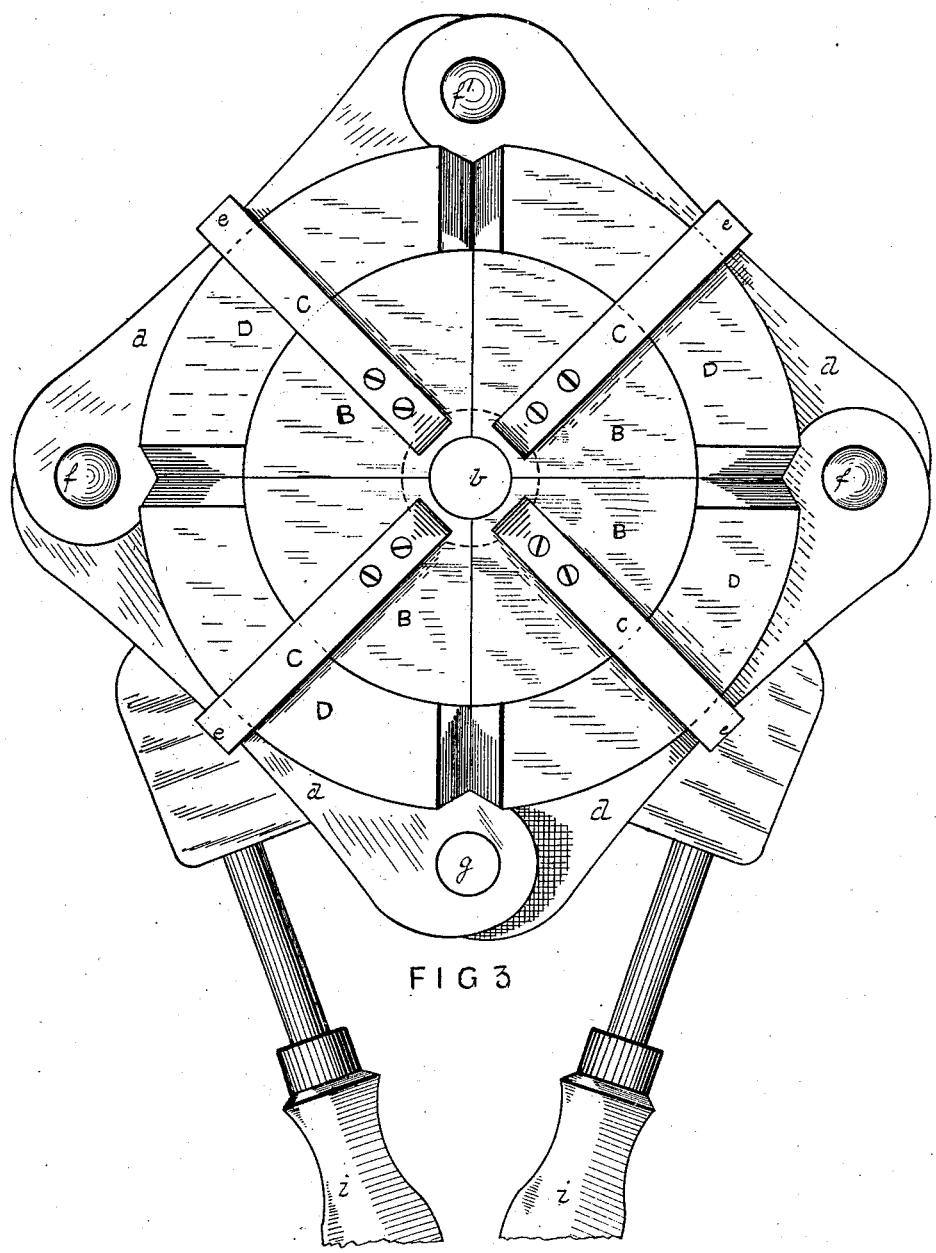
Figure 4:
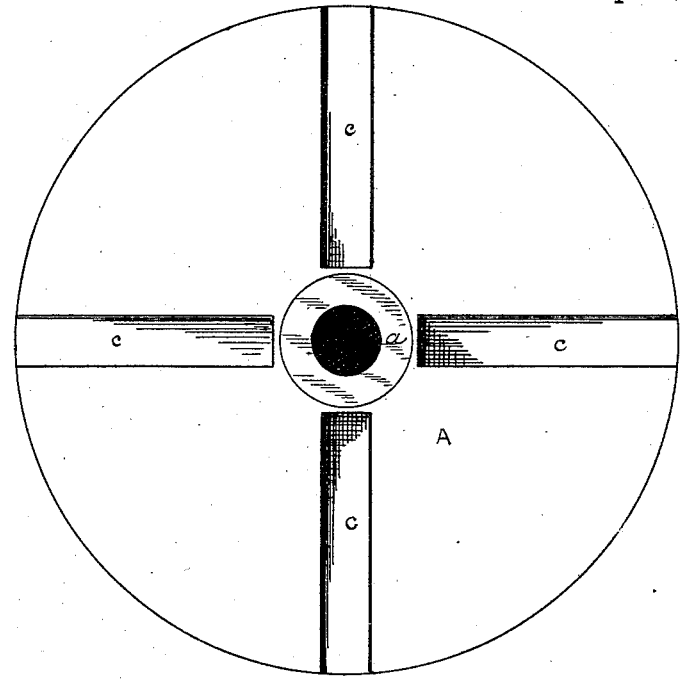
Figure 5:
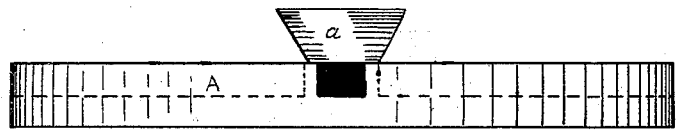
Figure 6:
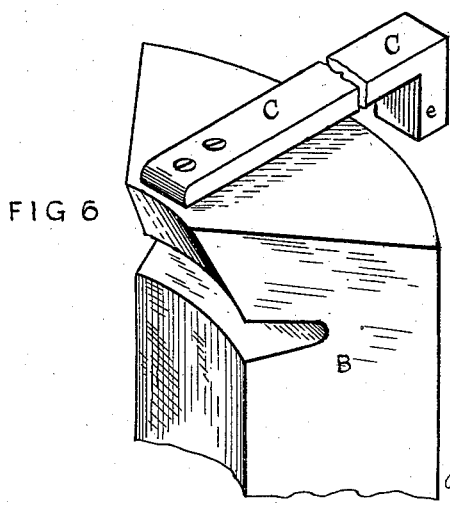
Figure 7:
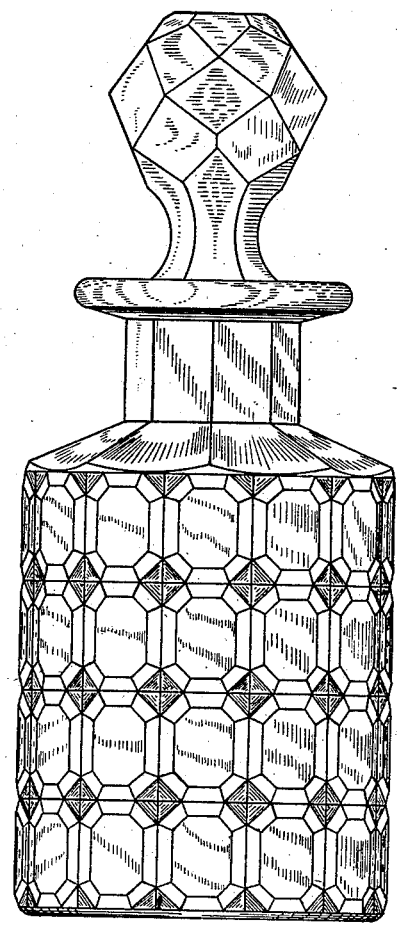

Figure 1 is a side elevation of my improved mold. Fig. 2 is a top view of the mold when partly opened. Fig. 3 is a view of the under side of the mold when closed and removed from the bed-plate. Fig. 4 is a plan view of the bed-plate of the mold. Fig. 5 is a side view of the bed-plate. Fig. 6 is an under side perspective view of one of the pieces of the sectional mold. Fig. 7 represents an article of glassware made with my improved mold.

In the several figures like letters refer to the same parts.

My invention is designed to furnish a mold in which articles of glassware can be pressed with a pattern deeply sunk in the surface of the glass, and removed from the mold without injury to the pattern so impressed thereon.

In the drawings, Fig. 7 represents such an article of glassware as I have referred to. The usual way of constructing molds for forming such articles is to make the mold in two or more pieces, which are hinged together. In order to remove the finished article from the mold, the mold is opened by the hinge, and when the pattern is deeply sunk in the glass the projecting portions of the surface of the mold, moving in the arc of a circle which has its center in the hinge of the mold, strike against the surface of the glass and partially obliterate or distort the pattern, destroying the sharp edges of the outlines of the pattern, which are essential to fineness of finish. The purpose of my invention is to prevent this defect in making pressed glassware, and I effect this purpose by dividing the mold in which the glass is to be pressed into several sections, the planes of section being in the line of the vertical axis of the mold, and causing these sections to move to and from the axis of the mold in closing and opening it in lines radiating from such axis.

The construction of my improved mold is as follows:

A, Fig. 1, is the bed-plate, on which the sections of the mold rest, being a circular plate having a punty bottom, $a$, in the center, through which is a circular opening, $b$, extending downward and gradually widening. On the upper side of the bed-plate A are radial slots $c$ at equal distances apart, extending from the periphery of the bed-plate to within a short distance of the punty bottom $a$. These slots $c$ are as many in number as the sections into which the mold is divided, which in the drawings is four parts. Fig. 6 represents the lower portion of one of these sectional parts B of the mold turned bottom up, in order to show the attachment of the slides C. These slides are of the same width and depth as the slots $c$ in the bed-plate, and one slide is screwed onto the bottom of each section B of the mold on a line radial to the circle of which the periphery of the section B is an arc, and midway from each extremity of the arc. These slides extend beyond the periphery of the sections B, and then turn upward at right angles at $e$, the distance between the inner edge of the part $e$ and the edge of the mold-section B being equal to the thickness of the shell D of the mold. (See Fig. 3.)

The shell D, which incloses the sectional parts B of the mold, is divided vertically, and may be so divided into as many parts as there are sections of the mold, and when closed forms a cylinder the internal diameter of which is equal to the external diameter of the cylindrical mold formed by placing together the several sections B of the mold. Each of the pieces of the shell D has a hinge-piece, $d$, situate about midway between the top and bottom of the shell, and extending beyond the edge of the sections of the shell on either side, and having a circular hole at each end, the center of each hole being in the plane extending from the end of the sectional part of the shell to the center of the mold, so that when the shell is closed around the mold the hole in the hinge-piece of one piece of the shell coincides with the hole in the hinge-piece of the adjoining piece of the shell, and a bolt or pintle, $f$, passed through these holes, completes the hinge. Where, as in the drawings, the mold is in four sections, there are three such hinges, as seen in Fig. 3.

$g$ represents the hole at the point of meeting of the extremities of two hinge-pieces, at the point where the shell is parted to open the mold, and instead of a pintle a pin, $h$, is inserted, (see Fig. 1,) which fastens the shell when closed, and which is removed when the mold is to be opened. On the side of the two-part sections of the shell are attached the handles $i$ $i$, by means of which the workman opens and closes the molds.

The operation of the mold thus constructed is as follows: The sectional parts B of the mold being placed on the bed-plate with the slide C of each entering the corresponding slot, $c$, in the bed-plate, and the shell D being closed around the sections of the mold and placed on the bed-plate and inside of the turned-up ends $e$ of the slides, the melted glass is placed in the usual way in the cavity of the mold, and the plunger of the glass-press is lowered into the cavity of the mold in the usual way, forcing the melted glass into all the interstices of the pattern cut on the interior surface of the mold. When the plunger of the press is raised out of the mold, the mold is opened by forcing the two handles $i$ $i$ apart. If the slides C C were absent, the two front sections B B of the mold nearest to the handles would open first, the front sections of the shell D D turning on the hinges at $f$ $f$, and afterward the two rear mold-sections B B would open, turning on the pintle $f'$ of the rear hinge, which, as before stated, is sure to injure the glass if the impressed pattern be deep; but by my construction of mold the sections B B of the mold cannot move outward from their center otherwise than in radial lines, because that is the only direction of motion permitted to the slides C by the grooves $c$, in which they are placed; but as the shell is opened by parting the handles, and the motion of the sections of the shell in opening being in the arcs of circles of which the hinges are the centers, this compound motion is accommodated by the upturned ends $e$ of the slides C sliding around the periphery of the sections D of the shell. The result of this compound motion is shown in Fig. 2, in which the mold is shown partly opened. It is manifest that by thus causing each of the sections of the mold to move outward from the piece of glassware which has been formed in the cavity of the mold in a line axial to the center of the mold, there is the least possible friction or interference of the projecting edges of the pattern of the mold with the projecting edges of the pattern molded on the glass, and the greater the number of sections into which the mold is divided the more nearly will each portion of the mold part from the glass article formed therein on an axial line, and the more perfect will be the effect produced.

My improvement, though chiefly important as a device for enabling articles of pressed glassware having exterior ornamentation in high relief to be delivered without injury from the mold, is also very useful in the case of plain molds. It may also be used for making various combinations of patterns by having the several sections of the mold of different patterns; or the sections may be plain, with a monogram or other device on one of them.

My improvement is equally applicable to molds for pressing glassware or for blowing glassware in a mold.

As the sections of the mold, when the mold is being opened, part from each other circumferentially as well as radially, as seen in Fig. 2, it will not be necessary that the part between the several sections be a plane surface, provided that the general direction of the section be substantially radial and vertical, because in some patterns it is desirable that the line of section should follow the angles of the pattern instead of being a right line.

I have represented my mold as being divided into four sections, as being generally sufficient and most convenient; but any desired number of sections may be used. In case of molds for making articles of glassware of polygonal shape, a mold made in two sections might be used.

Having thus described my improvement, what I claim as my invention, and desire to secure by Letters Patent, is—

1. A mold for glassware, composed of sections, the line of separation between the several sections being in a radial and vertical direction.

2. A mold for glassware, composed of two or more sections, the plane of section being substantially radial and vertical, in combination with devices, substantially as described, for causing the several sections to move in paths diverging radially from the axis of the mold.

3. In a mold for glassware, the combination of the mold-section B, slides C, bed-plate A, and hinged shell D, constructed and arranged substantially as described.

In testimony whereof I have hereunto set my hand this 13th day of July, A. D. 1883.

JAMES B. LYON.

Witnesses:
  W. B. CORWIN,
  L. C. FITLER.